United States Patent [19]
Christin

[11] 3,759,587
[45] Sept. 18, 1973

[54] SLIDES ESPECIALLY FOR VEHICLE SEATS
[75] Inventor: Georges Etienne Christin, 92 Marnes-la-Coquette, France
[73] Assignee: Establissements Bertrand Faure, Puteaux, France.
[22] Filed: Dec. 13, 1971
[21] Appl. No.: 207,168

[52] U.S. Cl. .................. 308/6 R, 308/3.8, 312/341
[51] Int. Cl. ........................................... F16c 29/04
[58] Field of Search ...................... 308/6 R, 3.8; 312/341

[56] References Cited
UNITED STATES PATENTS

| | | | |
|---|---|---|---|
| 2,612,208 | 9/1952 | Rhodes | 308/6 R |
| 2,840,139 | 6/1958 | Ragsdale | 308/6 R |
| 2,970,015 | 1/1961 | Ragsdale | 308/6 R |
| 3,001,835 | 9/1961 | Kramer | 308/6 R |
| 3,212,828 | 10/1965 | Pickles | 308/3.8 |
| 3,394,912 | 7/1968 | Bullen | 308/3.8 |
| 3,488,097 | 1/1970 | Fall | 308/3.8 |
| 3,545,716 | 12/1970 | Colautti | 308/3.8 |
| 3,685,872 | 8/1972 | Babbs | 308/6 R |

Primary Examiner—Charles J. Myhre
Assistant Examiner—Barry Grossman
Attorney—Eric H. Waters et al.

[57] ABSTRACT

The slide comprises a lower sectional element rigidly fixed to a floor and an upper sectional element supporting a seat. The two sectional elements are mutually slidable lengthwise on interposed ball bearings. The lower sectional element is composed of an inner U-element with a narrow base and two upwardly divergent wings, inclined to the vertical from about 30° to about 100° and of an outer U-element. The upper sectional element has an inverted U-element with two convergent wings enveloping said divergent wings. The upper surface of the bottom and the inner surface of the wings of the outer U-element of the lower sectional element, and the outer surface of the convergent wings of the upper sectional element form the ball race. The slide can be made of thinner sheet metal and is more resistant to dislocation by vertical tilting than previous slides.

12 Claims, 7 Drawing Figures

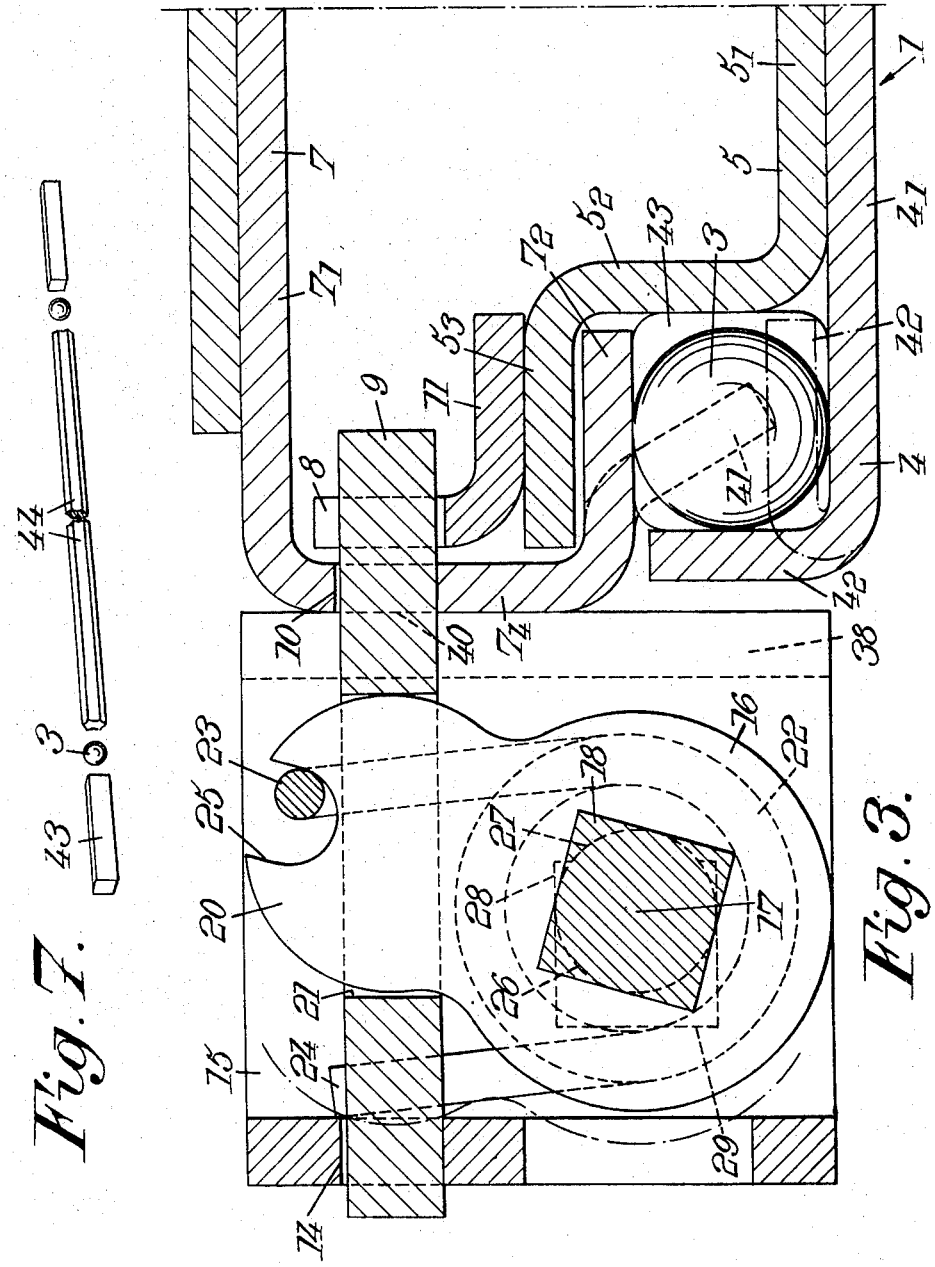

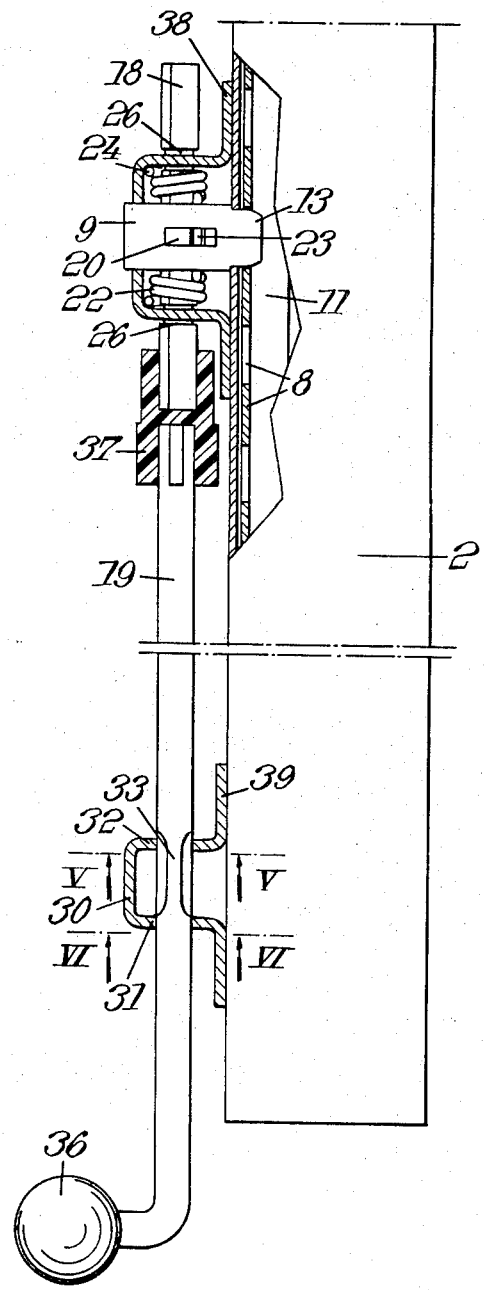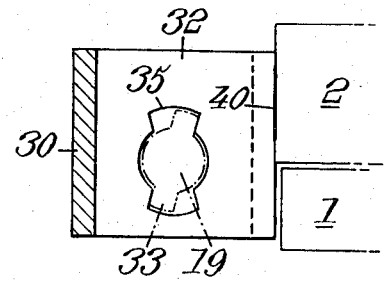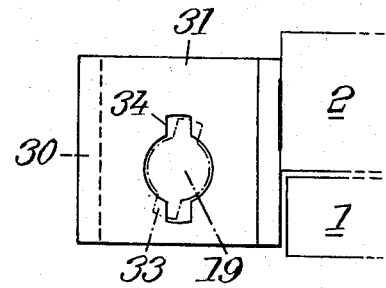

SLIDES ESPECIALLY FOR VEHICLE SEATS

The invention relates to slides and slide/adjusting means assemblies intended to enable and to guide the relative slidings of two structures mounted one on the other and it relates more particularly (because it is in their case that this application seems to offer the most advantage), but not exclusively, among these slides, to those for vehicle seats adjustable in forward or backward position.

The slides of the type concerned to which the invention relates comprise essentially a lower sectional element rigidly fixed to a first structure such as a vehicle floor and an upper sectional element supporting a second structure such as a seat, these two sectional elements being designed so as to be mutually slidable one along the other with the interposition of ball bearings.

The invention is especially devised to render these slides such they respond to the various exigencies of practice better than hitherto, especially as regards resistance to mutual vertical dislocation of their two component sectional elements, on urging one of these sectional elements to tilt, with respect to the other, and the simplicity and robustness of their locking system.

This resistance to dislocation must be particularly high in the case of automobile vehicle seats: it must avoid the application of a horizontal thrust of high intensity on the back of such a seat, for example by reason of sudden variation in the speed of the vehicle, being manifested by the dislocation of the slides of the seat.

Now in the majority of known slides the dislocating force of the upper sectional element is applied to the lower sectional element through the ball bearings, which have then a tendency to separate the wings of the sectional elements between which they are imprisoned, then to escape from these wings in allowing the dislocation.

In a known type of slide, it has already been proposed to arrange the balls in emplacements such that they cannot transmit the dislocating forces from one sectional element to the other, these forces being then directly applied between these sectional elements.

However in this type of slide, the areas, of the lower sectional element, which receive the dislocating force, are relatively easy to deform considering that this sectional element is in the general shape of an outer envelope of the slide, subject to flexion over the whole of its width and over the whole of its height and that the said areas terminate lateral wings of these particularly deformable sectional elements.

It is an object of the invention to overcome these drawbacks.

It is a further object to provide an improved adjusting means for such assemblies.

Another object is to provide an improved locking device for such slides.

Yet another object is to provide an improved slide-/adjusting and locking means assembly.

Other objects and advantages will be evident from the description which follows.

The slides of the invention are essentially characterised in that their lower sectional element is composed of two U-elements housed in one another, the lower U-element comprising a relatively narrow base, preferably welded against the base of the outer element, and two wings of which the upper portions are divergent, being inclined each to the vertical by an angle of from about 30° to about 100°, and in that their upper sectional element comprises an inverted U-element of which the two wings are convergent and designed so as to envelop quasi-contiguously the divergent portions of the wings thereabove, the ball race of the balls being constituted on one hand by the upper surface of the bottom and the inner surface of the wings of the outer element of the lower sectional U-element and on the other hand by the outer surface of the convergent wings of the upper sectional element.

In the preferred embodiments, relating to the case where the divergent upper ends of the wings of the inner U-element of the lower sectional element are substantially horizontal as also are the convergent lower ends of the wings of the inverted U-element comprised by the upper sectional element, recourse is had in addition to one or more other of the two following features, although this is not indispensable:

A first feature, regarding more especially the devices for locking in their various relative sliding positions the two sectional elements of the slide, consists in making such a device comprise: a rack rigidly fixed to one of the divergent wings of the inner U-element of the lower sectional element; a bolt adapted to coact with the slots of this rack by traversing contiguously a port formed in the lateral wall, of the inverted U-element, which runs along the said rack; means connected externally to the said wall to guide the said bolt and comprising preferably, in addition to the above port or first port, a second port cut-out horizontally facing the first in a capital omega shaped yoke or bracket having outwardly flanged arms welded on the said wall so as to straddle the first port; and means easily actuated by the user of the seat borne by the slide to control the slidings of the said bolt so as to disengage the latter from the rack or on the contrary to introduce it into a slot of the rack.

A second feature, regarding more particularly the ball housings, of substantially rectangular cross-section, formed between the two sectional elements, which housings are closed at their two longitudinal ends by feet folded back from the edges of the sectional element which bound these housings, consists of inserting in these housings on the one hand in the neighborhood of its two ends, blocks of rectangular cross-section constituted of a plastics material resistant to compression, and on the other hand in its central portion of a spacing bar of plastics material preferably star-shaped, the balls being each mounted between one of the blocks and the ring.

The invention comprises, apart from these main features, certain other features which are preferably used at the same time and which will be more explicitly considered below.

In the following there will be described two preferred embodiments of the invention by referring to the accompanying drawings given of course purely by way of non-limiting illustration.

In the drawings:

FIG. 3 shows in partial cross-section on a large scale another embodiment of a slide with its locking device constructed according to the invention;

FIG. 4 shows the slide of FIG. 3 in plan view, with portions removed;

FIGS. 5 and 6 are cross-sectional views of the said slide, along respectively V—V and VI—VI, of FIG. 4, with the rod removed; and FIG. 7 shows the various elements in longitudinal succession, according to the invention, in each of the housings of the balls.

Figure 1:
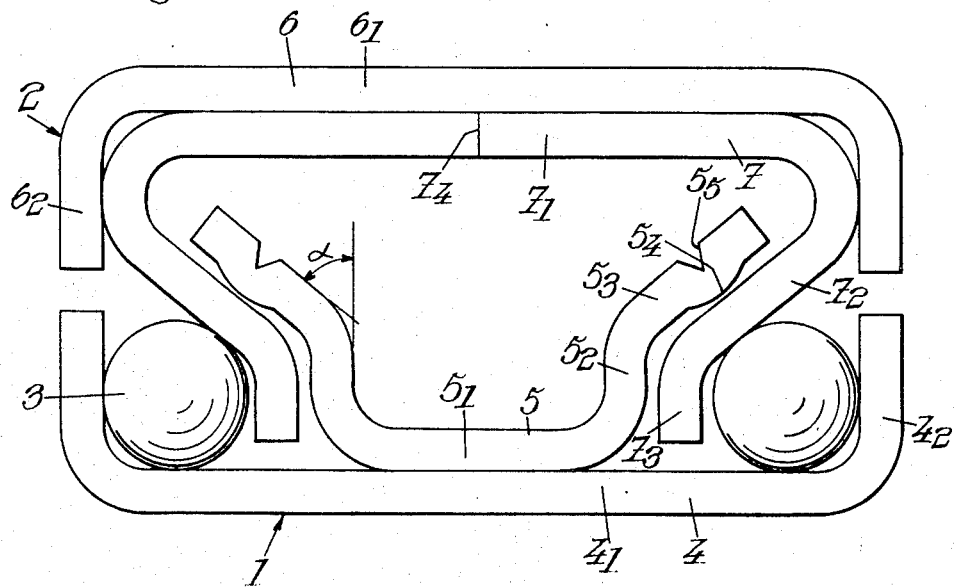
FIG. 1 is an end view of one embodiment of a slide constructed according to the invention.

In all cases the slide comprises a lower sectional element 1 and an upper sectional element 2 both having a common vertical longitudinal plane of symmetry and adapted to roll along one another by means of balls 3.

The lower sectional element 1 is composed of two elemental sectional elements or "elements" 4 and 5 having each in cross-section the general shape of a U and housed in one another.

The outer element 4 has a horizontal flat bottom $4_1$, relatively wide, connected to two relatively short vertical wings $4_2$.

The inner element 5 has a bottom $5_1$, distinctly narrower, its inner width being especially of the order of a third of that of the bottom $4_1$, and two wings of which the bases $5_2$, vertical and parallel, are connected to the divergent terminal extensions $5_3$.

Each of these extensions $5_3$ is inclined to the vertical at an angle $\alpha$ of from about 30° to about 100°, for example of the order of 50° (FIGS. 1 and 2) or preferably equal to 90° (FIG. 3).

The bottoms $4_1$ and $5_1$ are welded to one another so as to form a rigid one-piece sectional element 1.

Figure 2:
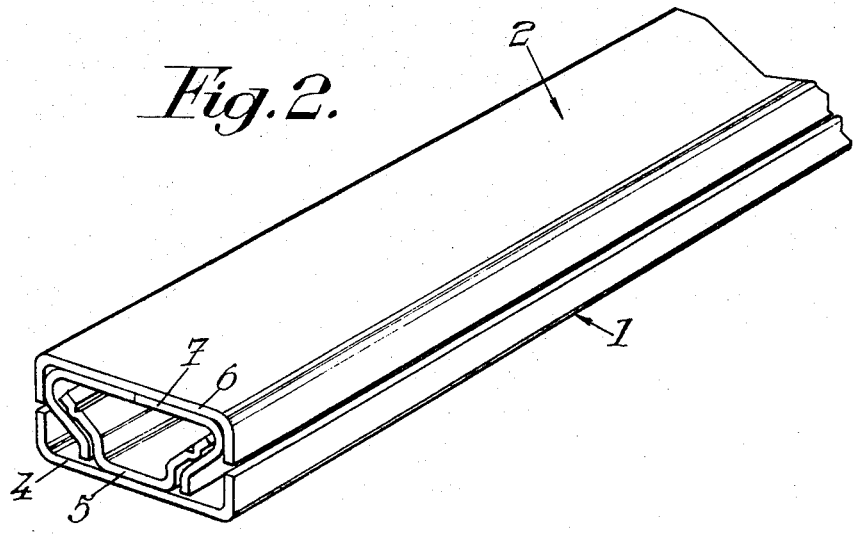
FIG. 2 is a perspective view of the slide of FIG. 1.

In the embodiment of FIGS. 1 and 2, the upper sectional element 2 is composed also of two elemental sectional elements or "elements" 6 and 7 each having a cross-section of the general shape of an inverted U.

The outer element 6 is then identical with the element 4 above and has like the latter a relatively wide flat bottom $6_1$ connected laterally to two relatively short wings $6_2$. As for the inner element 7, it has a bottom $7_1$ hardly narrower than that $6_1$ of the element 6 and two wings of which the convergent bases $7_2$ are connected to vertical terminal extensions $7_3$.

The angular convergence of the bases $7_2$ is the same as the angle of divergence of the extensions $5_3$ thereabove, so that these bases and extensions are in parallel pairs.

The bottoms $6_1$ and $7_1$ are welded to one another so as to form a rigid one-piece sectional element 2.

For reasons of ease of construction, it is advantageous to constitute each element 7 of two identical pieces connected longitudinally along a central common portion $7_4$: in fact, in view of the rigid tolerances permissible in this matter, the elements concerned cannot be obtained in practice by means of shapers but must be formed in a press with very accurate sides.

In the mounted slide the balls 3, at least two in number on each side of the slide, rest inside the element 4 on the bottom $4_1$ and along the wings $4_2$ of the latter and the wings ($7_2$, $7_3$) of the element 7 are introduced longitudinally between these balls and the wings ($5_2$, $5_3$) of the element 5 which envelop them quasi-contiguously.

Thus the weight of the upper sectional element 1 and of that which it supports is applied on the ball 3 by means of the oblique wings of element 7, which thrust the latter back laterally outwards against the vertical wings $4_2$.

There then exists practically no contact between the two sectional elements 1 and 2, or more precisely between their facing wing ends $5_3$ and $7_2$.

However, to avoid any risk of surface to surface contact between these facing wing ends and to reduce to linear segments their possible contact, a longitudinal rib can be provided in one at least of the two facing surfaces. In the embodiment illustrated in FIG. 1, such a rib $5_4$ appears on the outer surface of each extension $5_3$, each rib corresponding to a rib $5_5$ formed in the opposite surface of the extension concerned.

To avoid any contact between the ends of the wings of the elements 4, 5, 6 and 7 and the facing surfaces of the sectional elements, there are provided intervals of reasonable width generally at least equal to 1 mm, between these ends and these surfaces.

The slide which has just been described has numerous advantages over those hitherto existing, and in particular the following.

In the first place the resistance to vertical dislocation of its component elements is exceptional: the risk of such dislocation appears when there is exerted on the upper sectional element a tilting force with respect to the lower sectional element, which applies the ends of the wings $7_2$ of the first vertically against the ribs $5_2$ of the second. at one of the axial ends of each sectional element. Such an application urges at the same time the ends of the wings $7_2$ to separate and the ends of the wings $5_3$ to close up. The separation of the wings $7_2$ being blocked by the external presence of the ball 3, a possible dislocation of the two sectional elements can only be effected by mutual approach of the wings $5_3$ by bending. Now these wings resist bending remarkably well by reason of the very small distance which separates the point of application of the force (crests of the ribs $5_4$) and the bending zones most distant from these points envisagable for the said wings, zones corresponding to those of folding the bases of the wings $5_2$ on the bottom $5_1$. Consequently, on urging the slide into dislocation, the bending moment coming into play in the bending torque of the wings of the elements 5 remains relatively small and this torque remains relatively slight.

In addition it is possible to constitute the sectional elements integrally from a single and same type of relatively thin and weak sheet metal.

Moreover the slides obtained are relatively light and have little bulk.

Finally the enveloping shape of the two outer elements gives the assembly of the slide the generally appearance of a parallelepipedic casing slotted longitudinally at midheight, which casing is not only esthetic and easy to store, but also ensures a relatively good protection of the inner sliding mechanism against shocks and dust.

In an embodiment of the invention which has given entire satisfaction and given purely by way of illustration, the sectional elements were constituted of commercial sheet steel of 1.5 mm thickness, the outer sides of the slide obtained being 30 mm in width and 15.5 mm in height, the inner width of the bottom of the element 5 was 9 mm and the balls had a diameter of 5.16 mm.

With such a slide the resistance to mutual vertical dislocation of the sectional elements 1 and 2 was practically double that obtained with conventional slides and in any case distinctly higher than that corresponding to improved slides of however greater cross-section and formed of much thicker and stronger sheet metals.

In the embodiment illustrated in FIG. 3, each of the extensions $5_3$ is horizontal and the upper sectional element is constituted by an element 7 having a cross-section in the general shape of an inverted U with a flat bottom $7_1$ of which wing comprises a vertical face $7_4$ and one end $7_2$ folded back horizontally towards the inside of the slide just below the corresponding extension $5_3$.

Due to the fact of the horizontal and not oblique orientation of the diverging ends $5_3$, a relatively spacious volume is preserved above these ends, between the latter and the bottom $7_1$ of the inverted U element.

The locking device of this slide comprises:

a rack 8 connected to the upper surface of one of the two extensions $5_3$ and running along the adjacent vertical face $7_4$, a bolt 9 adapted to cooperate with this rack through a window 10 formed in the said vertical face $7_4$, means to guide the horizontal sliding of the bolt, and means easily accessible to the user of the seat to control the said slidings so as to be able to disengage at will the bolt form the rack or on the contrary to introduce it between the teeth of this rack.

The rack could be constituted by a outwardly curved end of the extension $5_3$.

In the embodiment illustrated, the said rack is constituted by the vertical wing slotted in one corner 11 of which the solid horizontal wing is welded on the said extension $5_3$.

This corner reinforces the resistance to deformation of the extension $5_3$, which constitutes a useful advantage.

The bolt 9 is constituted by a metallic plate of which a tongue 13 (FIG. 4) of reduced width can penetrate inside the window 10: the shoulders connecting this tongue to the rest of the bolt form end stops for this penetration.

The guide means for the bolt 9 comprise, in addition to the window 10 traversed contiguously by the tongue 13, a second window 14, cut-out, horizontally facing the window 10, in the bottom of a capital omega shaped yoke or outwardly flanged bracket-shaped element 15 welded to the face $7_4$. The cross-section of this window is determined so as to be traversed contiguously by the body of the bolt 9.

To control the horizontal slidings of this bolt, recourse is had to a lever 16 mounted in pivoting manner around an axle 17 parallel to the longitudinal direction of the slide, which lever is keyed inside the yoke 15 over a length of square cross-section 18 of a control rod 19, the rounded free end 20 of this lever being introduced contiguously into a slot 21 of the bolt 9.

A helical torsion spring 22 wound around the length 18 is supported on one hand at the free end of the lever 16 by its portion 23 and on the other hand at the bottom of the yoke by its portion 24.

In the preferred embodiment illustrated, the spring is symmetrical, its portion 23 is constituted by its median part, which is housed in a beak 25 of the lever, and its portion 24 is constituted by its two free ends.

The elastic expansion of the spring 22 constantly urges towards the slide not only the bolt 9, but also the length 18.

It is here that an important advantage exists since the said urging enables the axial maintenance in position of the portion 18 by making the recessed areas of the portion 18 coact with the edges of two openings 28 formed in the two arms of the yoke 15.

It suffices in fact to form in this portion 18 two circular grooves 26 and to cause each of them to straddle a corresponding complementary partly circular edge 27 (the edge which faces the slide) of one of the two openings 28.

Each of these openings has, on its side opposite its edge 27 (namely the left-hand side in FIG. 3) an edge 29 bounding a sufficient cross-section, especially square, to free axially a passage for the portion 18 after the latter has been on one hand displaced transversly towards this edge 29 and on the other hand displaced angularly by a sufficient angle by resisting the opposing return forces of the spring 22.

This construction is very advantageous in that it enables a particularly simple assembly, positive, robust and easily dismountable of the various parts of the mechanism with a much reduced number of these parts (four only: the bolt 9, lever 16, portion 18 and spring 22) without washers, screws, stops or other accessory members.

The control rod 19 fast in rotation to the square portion 18 is itself guided by another rigid bearing like the bearings of the upper sectional element 2 of the slide.

In the preferred embodiment illustrated, a second capital omega shaped yoke 30 (FIG. 4) is welded on the face $7_4$, at the front end of the latter, and its two front 31 and rear 32 arms are traversed by the said rod.

Over a length at least a little greater than the distance between the facing surfaces of these arms, the rod 19 has at least one longitudinal rib 33 extending, once the rod is mounted, from the rear surface of the front arm 31 to the rear surface of the rear arm 32. The ribs 33 are preferably two in number, diametrically opposite and identical.

The opening 34 formed in the front arm 31 to free a passage for the said rod has a shape complementary to that presented by the ribbed portion of this rod for an angular position other than that corresponding to the locking of the mechanism.

The opening 35 formed in the rear arm 32 to provide a passage for the rod has a shape such that the said ribbed portion not only passes through the latter whilst remaining correctly centered, but again can undergo angular displacements corresponding to the desired movements of the bolt.

This construction ensures an excellent axial positioning of the rod 19: once its ribbed portion has, during its positioning, traversed the two openings 31 and 32 axially rearwards, it suffices to release the rod, which ensures the locking by displacing the rib 33 angularly from the corresponding slot formed in the opening 34 and thus prevents its later axial displacement.

The lateral ends of the slots, of the opening 35, which receive the rib 33, serve to limit angularly the displacements of the control handle 36 of the rod 19.

This construction hence achieves for the mounting of the rod the same advantages of safety, simplicity, robustness and maximum reduction in the number of component parts as the construction described above for the mounting of the square portion 18.

To facilitate mounting and dismounting, or even to render them possible if the cross-section of the square portion is greater than that of the openings 34 and 35, the said portion and the rest of the rod are constituted by separate pieces and they are coupled between themselves by a sleeve 37 which may or may not be removable.

This sleeve, advantageously constituted of a hard plastics material such as that known under the commercial name DELRIN, cooperates contiguously with the tips of noncircular section of the pieces that it connects.

The locking device which has just been described is not only simple, and robust, as has been indicated above, but also lends itself to welding to the side $7_4$ of the movable sectional element of the slide after mounting of the square portion 18 and of the portion ribbed at 33 in their respective yokes 15 and 30.

It may be noted in fact that the axle 17 of these portions occurs lower than the said side, so that the feet 38 and 39 of the yokes may be easily reached by welding tools arranged above this axle and thus welded at spots at 40 on the said side.

According to another feature relating to the housings, of substantially square cross-section, balls 3, housings closed at their ends by terminal folded back feed 41, 42 of the wings bounding these housings, each of the longitudinal ends of these housings is filled, over a length of several centimeters, by a prismatic block 43 (FIG. 7) of substantially square cross-section constituted of a material resistant to compression, especially of the plastics material known under the commercial name DELRIN, and there is interposed between the balls 3 a spacing bar 44, preferably ribbed longitudinally.

The blocks 43 situated at the ends of the housings concerned are provided so as to be able to slide by following the movable sectional element in its displacements.

The role of the said blocks is to prevent deformations of the constituent metal of the sectional elements of the slide on urging the upper sectional element to tilt vertically with respect to the lower sectional element.

The cross-section of the bar 44 is preferably bounded externally by a star and the constituent material of this bar is advantageously a plastics material such as polyvinylchloride.

As is self-evident, and as already emerges from the foregoing, the invention is in no way limited to those of its types of application and embodiments which have been more especially considered; it encompasses, on the contrary, all variations.

I claim:

1. Slide to enable and to guide the relative slidings of two structures mounted on one another, comprising a lower sectional element adapted to be rigidly fixed to the first structure and an upper sectional element for supporting the second structure, these two sectional elements being designed so as to be mutually slidable along one another with the interposition of ball bearings, said lower sectional element being composed of two U-elements housed one within the other, the inner U-element comprising a relatively narrow base, and two wings of which the upper portions are divergent, each being inclined to the vertical at an angle of from about 30 to about 100° and said upper sectional element comprising an inverted U-element of which the two wings are convergent and designed so as to extend quasi-contiguously below said divergent wing portions, ball races for said balls being constituted on one hand by the upper surface of the bottom and the inner surface of the wings of the outer U-element of the lower sectional element and on the other hand by the outer surface of the convergent wings of the upper sectional element.

2. Slide according to claim 1, wherein said narrow base is welded to the base of said outer U-element.

3. Slide according to claim 1, wherein said various sectional elements are all formed of sheet steel of 1.5 mm thickness.

4. Assembly including in combination two structures and a slide, said two structures being mounted on one another by said slide, said slide comprising a lower sectional element adapted to be rigidly fixed to the first structure and an upper sectional element for supporting the second structure, these two sectional elements being designed so as to be mutually slidable along one another with the interposition of ball bearings, said lower sectional element being composed of two U-elements housed one within the other, the inner U-element comprising a relatively narrow base, and two wings of which the upper portions are divergent, each being inclined to the vertical at an angle of from about 30° to about 100° and said upper sectional element comprising an inverted U-element of which the two wings are convergent and designed so as to extend quasi-contiguously below said divergent wing portions, ball races for said balls being constituted on one hand by the upper surface of the bottom and the inner surface of the wings of the outer U-element of the lower sectional element and on the other hand by the outer surface of the convergent wings of the upper sectional element, said slide having also a locking device comprising: a rack rigidly fixed to one of the divergent wings of the inner U-element of the lower sectional element; a bolt adapted to coact with the slots of said rack in traversing a port formed in the lateral wall of the inverted U-element which runs along said rack; means attached externally to said wall to guide said bolt; and means capable of being actuated by the user of the seat borned by the slide to control the slidings of the said bolt so as to disengage the latter from the rack or on the contrary to introduce it into the slot of the rack.

5. Slide assembly according to claim 4, wherein the guide means for the bolt comprise, in addition to said port, a bracket having two outwardly flanged arms welded on said lateral wall so as to straddle said port and a second port in said bracket longitudinally facing said first port.

6. Slide assembly according to claim 5, wherein the control means for the bolt comprise: a rod extending parallel to the slide and of which one end passes through the two arms of the bracket; a control member rigidly fixed to said rod and easily accessible to a user; a lever keyed on the said rod between the two arms of the bracket so that its free end passes contiguously through a slot cut-out in the bolt; and a torsion spring wound around the rod and supported on one hand against the lever and on the other hand against the bracket so that it urges both the bolt and the rod in the direction of the slide, said rod having at the level of the openings of the bracket that it traverses grooves straddling the edges of these openings, and the cross-section of said openings being sufficient to free a passage at the end of the corresponding rod after a slight transverse displacement and possibly a slight angular displacement from its normal position.

7. Slide assembly according to claim 6, wherein a second bracket having two outwardly flanged arms is welded on the lateral wall thereabove, the opening formed in the arm, of this second bracket, closest to the first bracket, being traversed by a portion of the rod of non-circular cross-section and designed so as to only permit angular movements of this section of amplitude just sufficient to ensure the desired slidings of the bolt.

8. Slide assembly according to claim 7, wherein the opening formed in the other arm of the second bracket has a complementary section to that of the said portion of rod when the latter occurs in a position other than that corresponding to locking, said portion extending over a length a little greater than the distance between the two arms of said second bracket.

9. Slide assembly according to claim 7, wherein the portion of the non-circular cross-section of the rod comprises two identical diametrically opposite ribs.

10. Slide assembly according to claim 8, wherein the portion of the non-circular cross-section of the rod comprises two identical diametrically opposite ribs.

11. Slide assembly according to claim 5, wherein the rod comprises two parts connected by a suitable easily removable sleeve.

12. Slide assembly according to claim 1, wherein the ball-races are of substantially rectangular cross-section, and are occupied in the neighborhood of the two ends of the slide by blocks of rectangular cross-section constituted of plastics material resisting compression and in the central portion of the slide by a spacing bar of plastics material, each ball being mounted between a block and said spacing bar.

* * * * *

UNITED STATES PATENT OFFICE
CERTIFICATE OF CORRECTION

Patent No. 3,759,587     Dated September 18, 1973

Inventor(s) GEORGES ETIENE CHRISTIN

It is certified that error appears in the above-identified patent and that said Letters Patent are hereby corrected as shown below:

On the cover sheet, insert -- [30] Claims Foreign Priority Data   France  70/44832  Dec. 11, 1970 -- .

Signed and sealed this 13th day of August 1974.

(SEAL)
Attest:

McCOY M. GIBSON, JR.
Attesting Officer

C. MARSHALL DANN
Commissioner of Patents